United States Patent

Goldsby

[15] 3,673,271

[45] June 27, 1972

[54] ALKYLATION ACID RECOVERY PROCESS WITH ELIMINATION OF INERT HYDROCARBONS

[72] Inventor: Arthur R. Goldsby, Chappaqua, N.Y.

[73] Assignee: Texaco Development Corporation, New York, N.Y.

[22] Filed: Dec. 30, 1970

[21] Appl. No.: 102,689

Related U.S. Application Data

[63] Continuation-in-part of Ser. No. 740,916, June 28, 1968, abandoned, which is a continuation of Ser. Nos. 642,739, June 1, 1967, Pat. No. 3,564,073, and Ser. No. 692,623, Dec. 1, 1967, abandoned, and Ser. No. 704,934, April 4, 1968, abandoned.

[52] U.S. Cl....................................260/683.62, 260/683.61
[51] Int. Cl..........................................................C07c 3/54
[58] Field of Search...............................260/683.62, 683.61

[56] References Cited

UNITED STATES PATENTS

| | | | |
|---|---|---|---|
| 3,234,301 | 2/1966 | Goldsby | 260/683.62 |
| 3,442,972 | 5/1969 | Massa | 260/683.62 |
| 3,502,742 | 3/1970 | Goldsby | 260/683.61 |
| 3,564,073 | 2/1971 | Goldsby | 260/683.62 |
| 3,591,523 | 7/1971 | Goldsby | 260/683.62 |

*Primary Examiner*—Delbert E. Gantz
*Assistant Examiner*—G. J. Crasanakis
*Attorney*—Thomas H. Whaley and Carl G. Ries

[57] ABSTRACT

Process for recovering used sulfuric acid alkylation catalyst and eliminating normal paraffin hydrocarbons from olefin feed stocks for alkylation. Used sulfuric acid catalyst from an alkylation unit is reacted in a first absorber with a first portion of olefin feed employing a stoichiometric excess of acid for substantially complete conversion of olefin to alkyl sulfate. Unreacted paraffin hydrocarbons are separated from the resulting reaction mixture and removed. The acid phase from the first absorber is extracted with isoparaffin hydrocarbon being alkylated and the raffinate acid therefrom is sent to a second absorber wherein the raffinate acid is reacted with a second portion of olefin feed employing a stoichiometric excess of olefin for substantially complete conversion of the free acid and alkyl acid sulfates to dialkyl sulfates. The dialkyl sulfates are then separated and passed to the alkylation unit. Unreacted olefinic hydrocarbons are separated from the reaction mixture and passed to either the first or second absorber.

6 Claims, 2 Drawing Figures

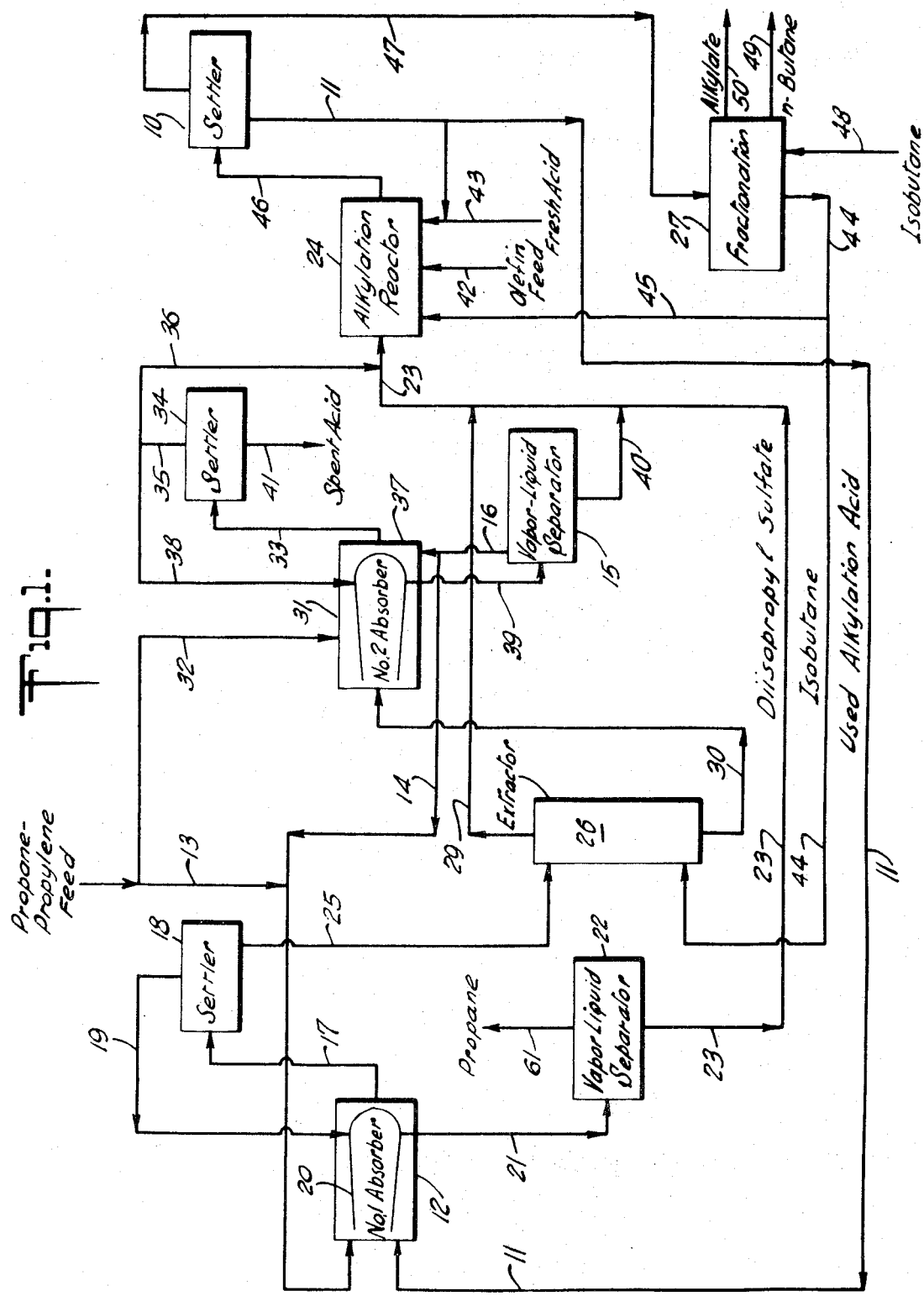

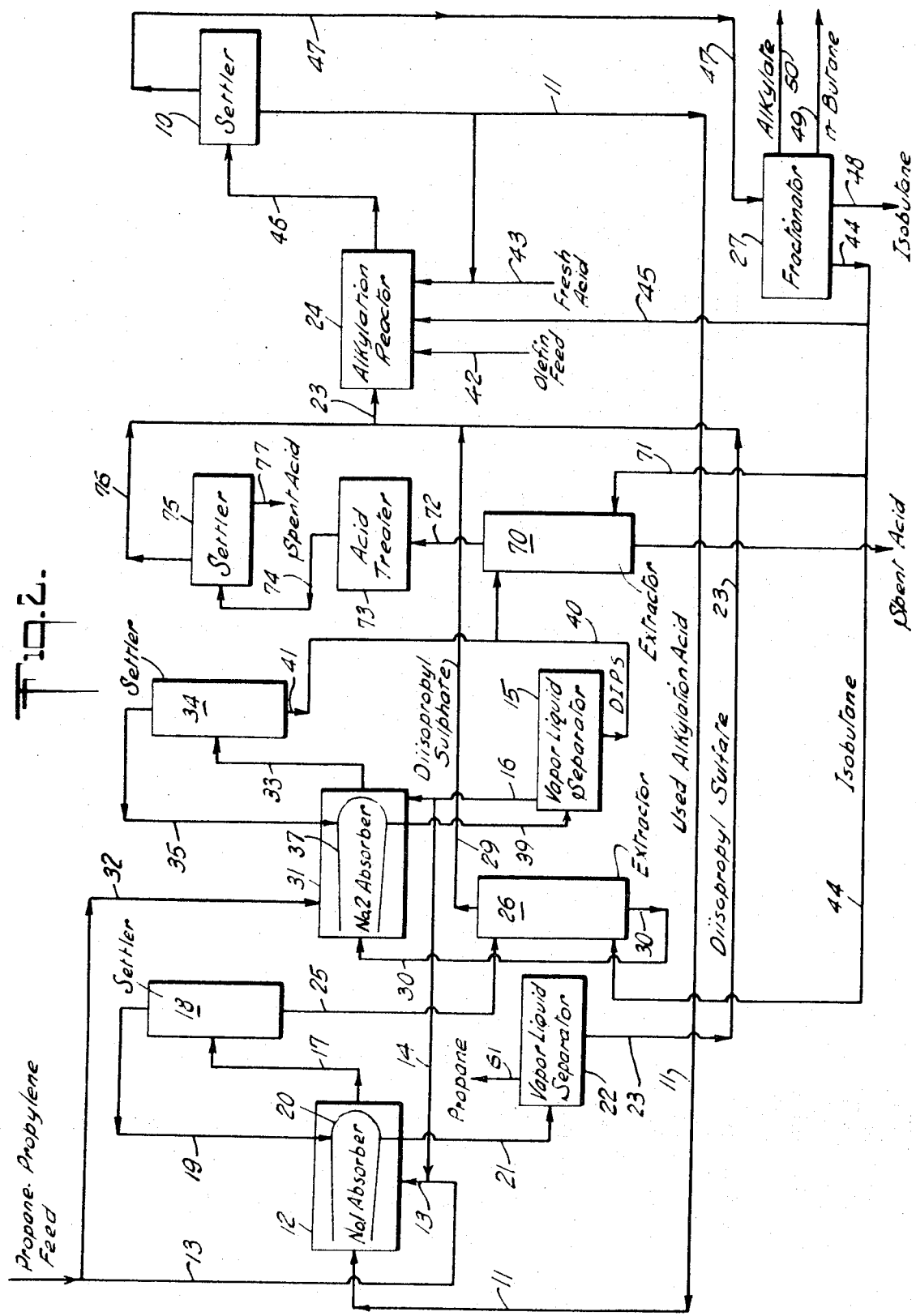

ALKYLATION ACID RECOVERY PROCESS WITH ELIMINATION OF INERT HYDROCARBONS

CROSS-REFERENCES TO RELATED APPLICATIONS

This application is a continuation-in-part of my copending application, Ser. No. 740,916, filed June 28, 1968 and now abandoned, which in turn was a continuation of my prior applications, Ser. No. 642,739, filed June 1, 1967, which issued as U.S. Pat. No. 3,564,073 on Feb. 16, 1971, Ser. No. 692,623, filed Dec. 1, 1967 and Ser. No. 704,934, filed Apr. 4, 1968 and now abandoned.

BACKGROUND OF THE INVENTION

1. Field of the Invention

This invention is related to an alkylation process with improved utilization of the sulfuric acid employed as a catalyst in the alkylation of olefins or aromatics with isoparaffins. More particularly, it is concerned with an improved method of restoring the catalytic effectiveness of used sulfuric acid catalyst by absorption of olefins therein, extraction with isobutane of the resulting dialkyl sulfates from the alkylation contaminants and alkylation of the extracted dialkyl sulfates and isoparaffin with the regeneration of sulfuric acid catalyst in the alkylation zone. Specifically, it is directed to the simultaneous removal of inert paraffin hydrocarbons from the olefin feed stock to the alkylation reaction by a novel method for carrying out the absorption step prior to alkylation.

2. Description of the Prior Art

It is known in the art to restore the catalytic effectiveness of sulfuric acid alkylation catalyst by absorbing olefins therein, extracting the dialkyl sulfates so formed, and alkylating the dialkyl sulfates with release of 100 percent sulfuric acid. It is also known in the art to eliminate paraffin hydrocarbon during the absorption step. However, in the prior art, as exemplified as in my copending Ser. No. 642,739, filed June 1, 1967, the reacted acid from the absorption step in which the paraffins are eliminated is sent to alkylation. Since this reacted acid contains not only the alkylation contaminants in the used alkylation catalyst but also those formed in the absorption step, an increase in acid consumption is experienced when this reacted acid is sent to alkylation. By means of the invention described herein it is possible to eliminate a large part of the non-alkylatable hydrocarbon inerts from the olefin feed, and at the same time eliminate alkylation contaminants from the used alkylation catalyst used for absorption of the olefins. Thus, the present invention results in a lower overall net acid consumption.

SUMMARY OF THE INVENTION

In accordance with my invention a major part of the absorption of the olefin is carried out in a first absorber with used sulfuric acid alkylation catalyst in a stoichiometric excess such that substantially all of the olefin present is reacted but only about 75–90 percent of the acid present is converted to dialkyl sulfate. Non-alkylatable hydrocarbons are separated as a hydrocarbon effluent from the reaction mixture from the first absorber and the remainder of the reaction mixture is extracted with solvent comprising the isoparaffin hydrocarbon being alkylated, thereby obtaining an extract solution of dialkyl sulfate in isoparaffin and a raffinate acid comprising unreacted sulfuric acid, alkyl acid sulfate, alkylation contaminants and water. The raffinate acid is passed to a second absorber wherein it is reacted with a second portion of olefin feed with a stoichiometric excess of olefin based on the amount of acid present so that as much as possible of the acid is reacted with olefin to form dialkyl sulfate. Unreacted hydrocarbon and dialkyl sulfate are separated from the reaction mixture and the dialkyl sulfate is passed to an alkylation zone. The unreacted hydrocarbon, which contains excess olefin, preferably is returned as olefin charge to one or both absorbers. Alkylation contaminants are retained in the remaining acid phase, which is discarded.

With my invention it is possible to obtain as low or lower net acid consumption as when using my acid recovery process, and at the same time eliminate paraffin hydrocarbon from a large portion of the olefin feed stock. This elimination of paraffin hydrocarbons reduces the amount of non-alkylatable or inert materials in the alkylation section, and as a consequence greatly reduces the amount of conventional expensive fractionation required. My invention thus makes it possible to use olefin feed stocks which could not be used in conventional alkylation either because of the presence of non-condensibles or because of too high a concentration of inerts.

BRIEF DESCRIPTION OF THE DRAWINGS

Having set forth the general nature of the invention, it will be best understood from the following more detailed description and the accompanying drawings. Although the drawings illustrate arrangements of apparatus in which the process of this invention may be practiced, it is not intended to limit the invention to the particular apparatus or materials described.

A flow is shown in FIG. 1 with two absorbers and one extractor without a separate extractor for the second absorber. A flow is shown in FIG. 2 with two absorbers and two extractors, and with acid treating of the extract from the second extractor. In each drawing refrigeration of the absorbers is provided by indirect heat exchange of the absorber settler overhead with absorber reaction mixture. This allows elimination of inerts from the first absorbers and recycle of unreacted olefin from the second absorbers.

DESCRIPTION OF PREFERRED EMBODIMENTS

Referring to FIG. 1, used alkylation acid catalyst from alkylation settler 10 is passed through line 11 to No. 1 absorber 12. Fresh propane-propylene feed through line 13 and unreacted propane-propylene from vapor-liquid separator 15 through lines 16 and 14 are passed to No. 1 absorber 12. The acid is in stoichiometric excess so that all of the propylene is absorbed by the acid. The absorber 12 is operated in the liquid phase at about 30°–40° F. and 75 psig. The reaction mixture from absorber 12 is passed through line 17 to settler 18. Overhead from settler 18 comprising propane and diisopropyl sulfate is passed through line 19 to tube bundle 20 in absorber 12 wherein the heat of reaction in absorber 20 causes evolution of propane. The vapor-liquid mixture from tube bundle 20 is passed through line 21 to vapor-liquid separator 22. Propane is taken off overhead through line 61 and may be recovered for use such as fuel or petrochemical feed stock. The remaining liquid which is mainly diisopropyl sulfate is passed through line 23 to alkylation reactor 24. The bottom acid phase from settler 18 comprising diisopropyl sulfate, propyl acid sulfate, free sulfuric acid and alkylation contaminants is passed through line 25 to counter-current extractor 26 near the top thereof. Isobutane from alkylation fractionation 27 is passed through line 44 to extractor 26 near the bottom.

The overhead from extractor 26 comprising isobutane and diisopropyl sulfate substantially free of alkylation contaminants is passed through lines 29 and 23 to alkylation reactor 24. The bottoms from extractor 26 comprising propyl acid sulfate, free sulfuric acid and alkylation contaminants are passed through line 30 to No. 2 absorber 31. Fresh propane-propylene feed in stoichiometric excess for conversion of all of the acid sulfate and free acid to dialkyl sulfate is passed through line 32 to absorber 31 wherein additional diisopropyl sulfate is formed, and the absorber reaction mixture is passed through line 33 to settler 34. The overhead from settler 34, comprising unreacted propane-propylene and most of the diisopropyl sulfate, is passed either directly to alkylation reactor 24 through lines 35 and 36 or to tube bundle 37 in No. 2 absorber 31 through lines 35 and 38 in indirect heat exchange with the absorber reaction mixture. The vapor-liquid from tube bundle 37 is passed through line 39 to vapor-liquid separator 15. The vapor phase effluent comprising unreacted propane-propylene is liquified and cooled by means not shown and a portion thereof recycled to absorber 31 through line 16. The remaining portion is passed to No. 1 absorber 12 through lines 16 and 14. The liquid phase effluent from separator 15, which is mainly diisopropyl sulphate is passed through lines 40 and 23 to alkylation reactor 24. The bottom acid phase from settler 34 comprising propyl acid sulfate and alkylation contaminants is discarded through line 41 as spent acid.

In addition to the various isobutane and diisopropyl sulfate streams passed to alkylation reactor 24 already described, additional olefin feed through line 42, fresh acid through line 43, recycle acid from settler 10 through lines 11 and 43 and isobutane through lines 44 and 45 are passed to alkylation reactor 24. The alkylation reaction mixture from reactor 24 is passed through line 46 to settler 10. Hydrocarbon comprising isobutane and alkylate is separated from acid in settler 10, and is passed through line 47 to fractionation 27. Extraneous isobutane also can be passed to fractionation 27 through line 48. Isobutane is taken off from fractionation 27 through line 44, n-butane through line 49 and alkylate through line 50.

Referring to FIG. II, used alkylation acid catalyst from alkylation settler 10 is passed through line 11 to No. 1 absorber 12. Fresh propane-propylene feed through line 13 and unreacted propane-propylene from vapor-liquid separator 15 through line 16, 14 and 13 are passed to absorber 12. The absorber reaction mixture is passed through line 17 to settler 18. The overhead from settler 18 is passed through line 19 to tube bundle 20 and the vapor-liquid from tube bundle 20 is passed through line 21 to vapor-liquid separator 22. Propane is taken off overhead through line 61, and remaining liquid is passed through line 23 to alkylation reactor 24. The bottom acid phase from settler 18 is passed through line 25 to extractor 26 near the top thereof. Isobutane is also passed to extractor 26 through line 44.

The overhead from extractor 26 is passed through lines 29 and 23 to alkylation reactor 24 and the bottoms from extractor 26 are passed through line 30 to No. 2 absorber 31. Fresh propane-propylene feed in stoichiometric excess for conversion of all of the acid sulfate and free acid to dialkyl sulfate is passed through the line 32 to absorber 31 wherein additional diisopropyl sulfate is formed. The absorber reaction mixture is passed through line 33 to settler 34. The overhead from settler 34 is passed through line 35 to tube bundle 37 in absorber 31. The vapor-liquid from tube bundle 37 is passed through line 39 to vapor-liquid separator 15. The separated vapor comprising unreacted propane-propylene is liquified and cooled by means not shown and recycled to absorber 31 through line 61 and passed to absorber 12 through lines 16, 14 and 13. Up to this point the flow of FIG. 2 is essentially the same as shown in FIG. 1.

The remaining liquid phase effluent from separator 15 is passed through line 40 to extractor 70, or if desired it may be sent directly to alkylation reactor 24 as shown in FIG. 1. The bottom acid phase from settler 34 is passed through line 41 to extractor 70. Isobutane is also passed to extractor 70 through lines 44 and 71. The overhead or extract from extractor 70 comprising isobutane, diisopropyl sulfate and alkylation contaminants is passing through line 72 to acid treater 73, and the acid treated extract is then passed through line 74 to settler 75. The overhead from settler 75 comprising isobutane and diisopropyl sulfate substantially free of alkylation contaminants is passed through lines 76 and 23 to alkylation reactor 24. The bottoms or spent acid from settler 75 comprising propyl acid sulfate, water and acid-polymeric oil complex is discarded through line 77.

In addition to the various isobutane and diisopropyl sulfate streams passed to alkylation 24 already described, additional olefin feed through line 42, fresh acid through line 43, recycle acid from settler 10 through lines 11 and 43, and isobutane through lines 44 and 45 are passed to alkylation reactor 24. The alkylation reaction mixture from alkylation 24 is passed through line 46 to settler 10 where a hydrocarbon layer comprising isobutane and alkylate is separated from an acid layer. The separated hydrocarbon layer is passed through line 47 to fractionation 27. Extraneous isobutane can also be passed to fractionation 27 through line 48. Isobutane is taken off from fractionation 27 through line 44, n-butane through line 49 and alkylate through line 50.

ACID RECOVERY SYSTEM

General

With the invention as described, inert paraffin hydrocarbons can be removed from all of the olefin feed stock charged to both or all of the absorbers, in other words, to the overall acid recovery system. In contrast to the invention disclosed in my copending application, Ser. No. 642,739, filed June 1, 1967, in the method of the present invention none of the spent acid from the acid recovery system is returned to the alkylation reactor. Thus, a lower net acid consumption can be realized with the present invention than with the method disclosed in my prior application.

The maximum amount of olefin which can be reacted with sulfuric acid to form dialkyl sulfates is 2 mols of olefin per mol of acid. Therefore, the maximum amount of n-paraffin which can be eliminated in the absorption system is the quantity associated with 2 mols of olefin per mol of acid charged to the absorber. The elimination of inerts or non-alkylatable hydrocarbons from the olefin feed ahead of alkylation, with the resulting increase in octane value of the alkylate (over and above any inherent increase due to the sulfuric acid recovery process), a decrease in fractionation costs, a major reduction in fresh net acid consumption and a corresponding reduction in spent acid could amount to considerably more than the savings in acid, especially when the alkylation is operated under conditions to give a relatively high acid consumption. Such a scheme is of particular interest for a unit in which propane fractionation is limited, or for charge stocks low in olefin content. It is also of particular interest for alkylation operations resulting in relatively high net acid consumptions, as will be shown later.

The invention functions best on a propylene olefin feed since it is easy to eliminate the propane. When operating on butylenes or mixed $C_3$–$C_4$ and it is desired to recover the isobutane in the butylene feed, the n-butane can still be kept out of the alkylation reactor. The isobutane-n-butane fraction from the absorber in which all of the olefin is reacted can be charged to the deisobutanizer or alkylation fractionation section, as shown in line 48 in the figures, as would be done with field butanes, for recovery of the isobutane.

It should be pointed out that the higher the net acid consumption when using the sulfuric acid recovery process, also identified as SARP, described herein, the higher is the percentage of the total olefin which can be charged to the absorption section for reaction with used catalyst acid. The following example will give a more quantitative idea of this. A 1,000 BPD production of alkylate requires about 571 BPD of propylene or 590 BPD of butylenes. When operating with SARP with a net fresh acid consumption of 0.3 lb. per gallon of alkylate, and assuming that all of the olefin which reacts in the absorber goes to dialkyl sulfate, approximately 548 BPD of propylene or 96 percent of the total is reacted in the absorber. The corresponding figures for butylenes are 452 BPD and 77 percent respectively. When operating with SARP with a fresh net acid consumption of 0.1, approximately 213 BPD of propylene or 37 percent is reacted in the absorber. The corresponding figures for butylenes in this case are 176 BPD and 30 percent.

It follows from the above numbers that for n-paraffin elimination in the absorption sections as much of the olefin as possible should be reacted in the first absorber consistent with almost complete reaction of the olefin and little if any extraction of polymeric oil. The superiority of propylene over butylenes is a result of its lower molecular weight and its lower weight in pounds per barrel. Thus, with a net acid consumption of about 0.3 lb. per bbl. of alkylate nearly all of the propylene is reacted in a first absorber with elimination of propane. This is a fairly high acid consumption, and in many cases would be a result of a low isobutane concentration and/or a high temperature in the alkylation section. With SARP as described, SARP can contribute to a lower alkylation temperature and a higher isobutane concentration. As indicated hereinbefore, it is preferred to charge a major portion of the olefin feed to the first or No. 1 absorber of the absorption system, that is, the one to which used alkylation acid from the alkylation settler is charged, and a minor portion of the olefin feed to the second or No. 2 absorber to which the unreacted acid from the first absorber is charged. Olefin charge to the No. 1 absorber should be less than the stoichiometric amount required for conversion of sulfuric acid to dialkyl sulfate (2 moles of olefin for each mole of sulfuric acid). The quantity of olefin charged to the No. 2 absorber should be in excess of the stoichiometric amount required for complete conversion of the acid and alkyl acid sulfate to dialkyl sulfate based on a ratio of 2 moles of olefin for each mole of sulfuric acid present and 1 mole of olefin for each mole of alkyl acid sulfate present. The amount of inerts which can be eliminated in the absorption system is determined by the amount of olefin feed which can be charged to the first absorber where substantially complete removal of olefin from the olefin feed which is obtained. Since as much of the acid as possible should be converted to extractable dialkyl sulfate in the second absorber, this means that as a practical matter an excess of olefin is required. Thus, with respect to the olefin charged to the absorption section it is preferred to charge about 75 to 90 percent of the total olefin feed to the first absorber, and 10 to 25 percent to the second absorber. Substantially all of the 75–90 percent of the olefin charged to the first reactor should be reacted therein to form dialkyl sulfates and alkyl acid sulfates. Not all of the dialkyl sulfate is extracted from the absorption mixture in the subsequent extraction step and the quantity of acid phase passed to the second absorber is usually equivalent to somewhat more than the remaining 10–25 percent of acid which does not react in the first absorber. Generally of amounts to about 15–50 percent.

In order to conserve olefin values and to obtain maximum elimination of inerts from the olefin feed, unreacted olefin from the second absorber is recycled to one or both of the absorbers.

Because an excess of olefin is used in the second absorber, it is obvious that in addition to inerts or non-alkylatable hydrocarbons the overhead from vapor-liquid separator 15 also contains unreacted olefin. This olefin can be conserved by recycle of this overhead stream to one or both of the absorbers. It can be recycled to the No. 2 absorber to maintain the condition of excess olefin in this absorber or it can be recycled to the No. 1 absorber to obtain elimination of inerts therefrom. Generally, it is desirable to recycle a portion to each absorber.

If the first absorber is operated so as to give a major but not complete conversion of the acid, say 75–90 percent or so of the ultimate, it is possible to eliminate most of the n-paraffins from the reactor feed to the alkylation reactor. In a liquid phase absorption operation, the hydrocarbon portion separated from the reaction mixture can be flashed to remove n-paraffins, or used for refrigeration in indirect heat exchange with either or both of the olefin absorbers and/or alkylation. In vapor phase absorption operation, the bulk of the n-paraffin can be removed directly in the vapor phase. In either type of operation it is desirable to recover as much as possible of the dialkyl sulfate from the associated acid phase and send it directly to the alkylation, since it ordinarily is very low in or free of polymeric oil because in the extraction of the acid phase from the first absorber the acid concentration is sufficiently high to hold the polymeric oil tightly in the acid phase and it is not extracted therefrom by the hydrocarbon solvent. The residual or raffinate acid from the extraction step is sent to the second absorber. The final 25 percent or so of conversion of the acid to dialkyl sulfate is carried out in the second absorber.

In the method of FIG. 2, the isobutane-dialkyl sulfate solution from the second extractor (extractor 70) may contain an appreciable amount of polymeric oil. In such case it is desirable to treat this extract, as by acid treating, to remove the polymeric oil. The two absorbers can be operated so that the amount of dialkyl sulfate extract from the second absorption stage is minor in relation to the quantity obtained from the first absorption stage. If, under the conditions used, sufficient oil is extracted from the acid phase in second extractor 70, this can be handled satisfactorily by removing excess unreacted hydrocarbon from the acid phase, as by indirect heat exchange followed by vapor-liquid separation, extracting the dialkyl sulfate from the acid phase with isobutane, and then acid treating the isobutane extract with used alkylation acid, as shown in FIG. 2 attached. The amount of used acid employed for treating should not exceed about 0.05 to 0.1 pound per gallon of alkylate, and can be less depending on the amount of oil extracted.

ABSORPTION SYSTEM

A propylene-containing stock is the preferred charge stock since propylene is usually associated with an appreciable quantity of inerts, and in some cases the propane is present in sufficient quantity such as to make the stock unsuitable for alkylation by the methods of the prior art. Butylene and amylene stocks also can be used, preferably after removal of tertiary olefin such as by the methods disclosed in my copending applications, Ser. No. 693,333, filed Dec. 12, 1967, now U.S. Pat. No. 3,502,742 and Ser. No. 740,761 filed June 27, 1968, now U.S. Pat. No. 3,591,523. Charge stocks which have a high content of inerts, such as the effluent gas from a polymerization unit, are of particular interest.

Since inerts are associated with olefin feed stocks, the greater the quantity of olefin reacted with used acid in the first absorber, the greater is the quantity of inerts which may be eliminated from the alkylation system. Thus, from a consideration of inerts elimination alone, a ratio two moles or more of olefin per mole of acid is preferred. However, since any unreacted olefin would be eliminated from the system with the inerts and therefore would be lost, it is essential to react substantially all of the olefin in the first absorber. For this reason, usually not over about 1.5 to 1.8 moles of olefin per mole of acid should be reacted.

The olefin absorption can be carried out in either vapor or liquid phase, or in a combination of the two. Cooling in the absorption step may be effected, if desired, by introducing all or a part of the charge, or extraneous hydrocarbon, such as propane, in liquid phase and allowing it to vaporize by the heat of reaction in the absorber. Cooling may also be effected by using charge streams to the absorber cooled to a temperature below the absorber reaction temperature, for example, the used acid catalyst may be supplied from an emulsion flashing alkylation operation. Cooling may also be obtained by indirect heat exchange with cooling coils either in the absorber or outside as shown in the Figures.

Used alkylation acid catalyst having a titratable acidity of 88 to 93 percent by weight and containing only about 2 to 4 percent water is the preferred acid charge stock for the absorption step, although in some cases, for example, if amylenes are being alkylated, the catalyst may have a concentration as low as 80 to 85 percent. Acid from other sources, such as fresh acid, acid from chemical reactions, and acid from the acid treatment of petroleum naphtha or lube oil also can be used.

A short residence time and low temperature are conducive to good results in the absorber and are preferred, although other factors have a considerable bearing. The efficiency of contacting of olefin with acid is of course very important. Residence times as short as a few seconds or minutes may be used, if a feed stock is passed through an efficient containing device. On the other hand, a residence time as long as an hour or longer may be used in a liquid phase reactor, or in a packed countercurrent tower by venting inerts in vapor phase and recycling liquid reaction mixture from near the bottom of the tower to about half way up or higher in the tower.

A temperature range of 30° to 50° F. is satisfactory for propylene although less conjunct polymer is formed at lower temperatures. For n-butylene containing stocks, a temperature of 20° to 40° F. is preferred.

The absorption step can be conducted in contacting equipment will known in the art, for example, mixer settlers, centrifugal contractors, countercurrent towers or two or more mechanically stirred reactors operating to give countercurrent flow. Multi-stage countercurrent contacting is preferred.

The absorption step can be conducted in contacting equipment well known in the art, for example, mixer settlers, centrifugal contactors, countercurrent towers or two or more mechanically stirred reactors operating to give countercurrent flow. Multi-stage countercurrent contacting is preferred.

The absorption step can be conducted in contacting equipment well known in the art, for example, mixer settlers, centrifugal contactors, countercurrent towers or two or more mechanically stirred reactors operating to give countercurrent flow. Multi-stage countercurrent contacting is preferred.

When the absorbers are operated in the liquid phase, the unreacted hydrocarbon will dissolve or extract an appreciable amount of dialkyl sulfate, for example, about 20 percent by weight of dipropyl sulfate at about 30° F. in propane-propylene. This results in a greater conversion of the acid to dialkyl sulfates, as it tends to keep shifting the equilibrium from free sulfuric acid and alkyl acid sulfate to dialkyl sulfate. It is desired to send the dipropyl sulfate to alkylation, and yet this is undesirable if too much propane or normal butane is associated with it, since such diluents adversely affect the alkylation reaction. Such diluents may be removed and concomitantly cooling for the absorber furnished by flashing the settler overhead and passing the resulting cooled liquid-vapor mixture in indirect heat exchange with the absorber. The resulting liquid-vapor mixture after use for cooling is separated and the liquid containing dialkyl sulfate substantially reduced in propane or butane content is then sent to alkylation.

It is emphasized that it is desired to convert as much as possible, preferably at least 80 to 90 percent or higher of the used sulfuric acid catalyst in the final absorption step to dialkyl sulfate. This can be done by using good absorption conditions, including efficient mixing, countercurrent flow, and an excess of olefin in relation to the amount of acid and alkyl sulfates present based on a ratio two moles of olefin for each mole of sulfuric acid present and one mole of olefin for each mole of alkyl acid sulfate present.

EXTRACTION

Low temperature and short times are preferred for the hydrocarbon extraction of the olefin absorber reaction product. For example, a temperature range of 30° to 50° F. with a few minutes residence time is satisfactory. However, good results have been obtained at ambient temperatures as high as 85° to 100° F. The conditions depend somewhat upon the absorption product and the olefin used for the absorption step.

The extraction step can be effected in equipment known in the art, for example, mixer-settlers, centrifugal contactors or countercurrent towers, for example, a rotating disc contactor. Less efficient extraction may be used to accomplish the same results if a small amount of water is added to the absorber reaction product.

Dialkyl sulfates are more readily extracted with a hydrocarbon than the alkyl acid sulfates. It is desirable to use conditions in the extraction step which will result in the extraction of as much of the dialkyl sulfate as possible and to approach as nearly as possible only acid-oil reaction product and water in the raffinate spent acid phase, with all of the alkyl sulfates in the extract or organic phase; this is particularly true of the second or final extractor. Such conditions include the use of a liquid solvent dosage of the order of 6 moles per mol of alkyl sulfate, or higher, raffinate recycle, multi-stage counter-current extraction, and optimum charge rate for a given extraction vessel. The raffinate or spent acid from the final extraction step comprises water, alkyl acid sulfate, dialkyl sulfate and the reaction product of acid and polymeric oil formed during the alkylation and absorption steps. The extract comprises the hydrocarbon solvent, dialkyl sulfate, and a minor amount of alkylacid sulfate.

ACID TREATMENT OF EXTRACT

A unique feature of this particular absorption system resides in the fact that it can be operated in a preferred manner so that only a minor portion of the total dialkyl sulfate extract needs to be treated to remove polymeric oil alkylation contaminant. During the extraction of the first absorber reaction product, the residual acid is so strong that the polymeric oil is not extracted by the hydrocarbon solvent; it is held tightly by the acid in the acid-polymeric oil complex.

The weaker the raffinate acid in the extraction step, the higher is the relative solubility of the polymer oil in hydrocarbon solvent, or the polymer oil is held less tightly by the acid. Polymeric oil contaminant in the absorber-extractor extract is highly unsaturated and it reacts readily and exothermally with strong sulfuric acid, such as fresh make-up acid used for the alkylation step, or used alkylation acid catalyst of about 90 percent concentration. The polymeric oil can be removed from the absorber extract by acid treatment prior to charging it to alkylation, and optionally after removal of any excess unreacted olefin. Good results have been obtained by acid treating polymeric oil in isobutane solution with used alkylation acid of about 90 percent concentration at a temperature of 85° F. and a time as long as 1 hour in an amount approximately equal in weight to that of the free polymeric oil. However, a temperature not over about 40° to 60° F. and a short time on the order of a few minutes or less are preferred. A very short time such as is obtained by mixing with a pressure drop orifice is satisfactory. To insure substantially complete removal of the oil and also any water present, an excess of acid is used. However, if too great an excess of acid is used, some dialkyl sulfate will dissolve in it and be lost from the extract. This is not too serious as the dialkyl sulfate may be reextracted with a hydrocarbon solvent from the separated acid phase, as disclosed in my copending application, Ser. No. 599,880, filed Dec. 7, 1966. Or when operating in a continuous system, the acid phase may be charged to the main extraction tower. Alternatively to acid treating the extract, the absorber reaction product prior to extraction of the dialkyl sulfates can be acid treated to remove the polymeric oil.

ALKYLATION

In general, the conditions for the alkylation step are those which are well known in the art. However, the bulk of the make-up acid is charged to alkylation as alkyl sulfates from the recovery section, and only a minor proportion of the acid is charged as fresh make-up acid of the usual 98.0–99.5 percent concentration. Since the alkyl sulfates are substantially water free the trend is for the system catalyst, when using my acid recovery process, to be of lower water content, and, in general, of superior quality in that a lower end point alkylate of higher octane value is obtained. On the other hand, less drying of charge stock can be used, in which case the water content of the system catalyst may be as high as in conventional operation without acid recovery. The sulfuric acid in the alkylation system is usually maintained within a range of about 88–95 percent by purging spent acid from the system. In a multiple reactor system the acid of lowest concentration will be purged and sent to the acid recovery system.

A large excess of isobutane is used, for example as much as 60–80 volume percent of the hydrocarbons in the alkylation reaction mixture. Consequently a large quantity of isobutane must be recovered and recycled for reuse in the alkylation process. It is also available for use in the recovery process as described.

In addition to the olefin which is charged to the alkylation step in the form of alkyl sulfates, additional fresh olefin is usually charged to the alkylation step. For example, when propylene and/or butylenes, and especially propylene, are used for the absorption step, it is advantageous to use butylenes also in the alkylation step.

As indicated hereinbefore, to the extent that n-paraffin is removed in the absorption system, it does not have to be removed by expensive fractionation after alkylation. In addition, by not being present in the alkylation zone by virtue of not being in the olefin feed to alkylation, a higher isobutane concentration is obtained in the hydrocarbon portion of the alkylation reaction mixture. This in turn gives a lower acid consumption, a higher octane alkylate, and an alkylate with a lower 90 percent point and end point.

Obviously, many modifications and variations of the invention as hereinabove set forth, may be made without departing from the spirit and scope thereof, and therefore, only such limitations should be imposed as are indicated in the appended claims.

I claim:

1. In a process wherein isoparaffin is alkylated with olefin and alkyl sulfate in the presence of sulfuric acid alkylation catalyst in an alkylation reaction zone containing a reaction mixture comprising an emulsion of hydrocarbon reactants and acid catalyst wherein said acid catalyst becomes contaminated with alkylation contaminants, and wherein emulsion effluent comprising said reaction mixture is withdrawn from said reaction zone, said emulsion effluent is separated into a hydrocarbon phase and a used acid phase containing alkylation contaminants, a portion of said used acid phase is separated and reacted with olefins by absorption thereof forming an absorption reaction mixture from which dialkyl sulfates are recovered and passed to said alkylation reaction zone, the improvement comprising:
  a. reacting used sulfuric acid phase from said alkylation reaction zone in a first absorber with a first portion of an olefin feed containing inert hydrocarbons to form a first absorber reaction mixture, the total quantity of olefin charged to said first absorber being less than the stoichiometric quantity required for conversion of all sulfuric acid to dialkyl sulfate,
  b. separating said first absorber reaction mixture into a first absorber effluent acid phase and a first absorber effluent hydrocarbon phase,
  c. separating said first absorber effluent hydrocarbon phase in a first vapor-liquid separator into a gaseous phase comprising inert hydrocarbons and a liquid hydrocarbon phase,
  d. discarding said gaseous inert hydrocarbons from said process,
  e. passing said liquid hydrocarbon phase from step (c) to said alkylation reaction zone,
  f. extracting dialkyl sulfate from said first absorber effluent acid phase with a hydrocarbon solvent comprising the isoparaffin being alkylated thus producing a dialkyl sulfate-isoparaffin hydrocarbon extract solution and a raffinate acid,
  g. passing said dialkyl sulfate-isoparaffin extract solution to said alkylation reaction zone,
  h. reacting said raffinate acid in a second absorber with a second portion of said olefin feed to form a second absorber reaction mixture, the quantity of olefin charged to said second absorber being greater than the stoichiometric quantity required for conversion of all sulfuric acid and alkylacid sulfate in said raffinate acid to dialkyl sulfate,
  i. separating said second absorber reaction mixture into a second absorber effluent acid phase and a second absorber effluent hydrocarbon phase,
  j. discarding said second absorber effluent acid phase from said process as spent acid,
  k. separating said second absorber effluent hydrocarbon phase in a second vapor-liquid separator into a gaseous phase comprising unreacted olefin and inert hydrocarbons and a liquid hydrocarbon phase,
  l. passing said liquid hydrocarbon phase from step (k) to said alkylation reaction zone,
  m. passing at least a portion of said gaseous phase from step (k) to said first absorber.

2. The method of claim 1 wherein a portion of said gaseous phase from step (k) is passed to said second absorber.

3. The method of claim 1 wherein said liquid hydrocarbon phase from step (k) is extracted with a hydrocarbon solvent comprising the isoparaffin being alkylated to yield a second dialkyl sulfate-isoparaffin hydrocarbon extract solution and a second raffinate acid, said second raffinate acid being discarded as spent acid, said second extract solution being acid treated and then passed to said alkylation reaction zone.

4. The method of claim 1 wherein said olefin feed comprises propylene and propane.

5. The method of claim 1 wherein said olefin feed comprises n-butylenes and n-butane.

6. The method of claim 1 wherein said quantity of olefin charged to said first absorber is in the range of 1.5 to 1.8 moles of olefin for each mole of sulfuric acid charged to said first absorber.

* * * * *